March 1, 1949.  W. D. HIRSCHKORN  2,462,967

VINE SPLITTING UNIT FOR BEAN CUTTERS

Filed May 26, 1947

INVENTOR
Wm. D. Hirschkorn

BY

ATTORNEYS

Patented Mar. 1, 1949

2,462,967

UNITED STATES PATENT OFFICE 2,462,967

VINE SPLITTING UNIT FOR BEAN CUTTERS

William D. Hirschkorn, Livingston, Calif.

Application May 26, 1947, Serial No. 750,409

1 Claim. (Cl. 56—316)

This invention relates to bean cutters and particularly represents improvements over the vine splitting unit shown in my Patent No. 2,305,254 dated December 15, 1942; the initial bean cutting mechanism as shown in said patent being retained in the present instance.

The principal object of the present invention is to provide a vine splitting unit which will effectively split and cut through all vines in its path regardless of their length and entangled condition, thus insuring very efficient bean harvesting operations.

A further object of the invention is to produce a practical device and one which will be exceedingly effective for the purpose for which it is designed.

These objects are accomplished by means of such structure and relative arrangement of parts as will fully appear by a perusal of the following specification and claim:

Figure 1:
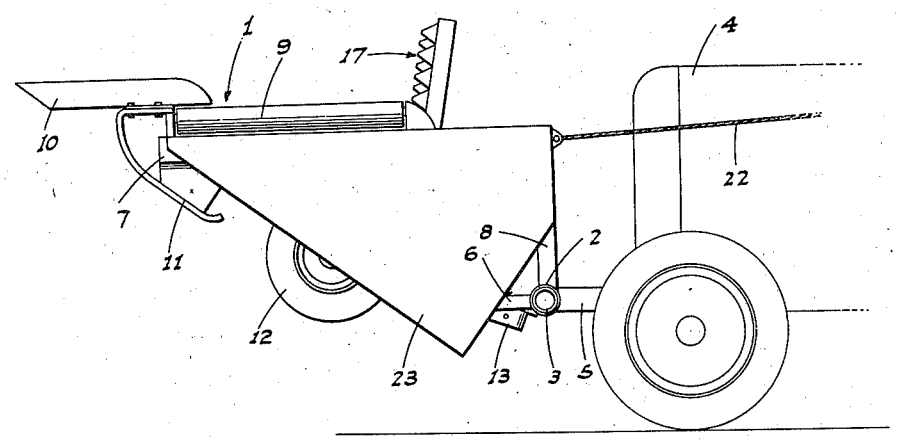
Figure 1 is a side elevation of the vine splitter shown in its raised inoperative position.
Figure 2:
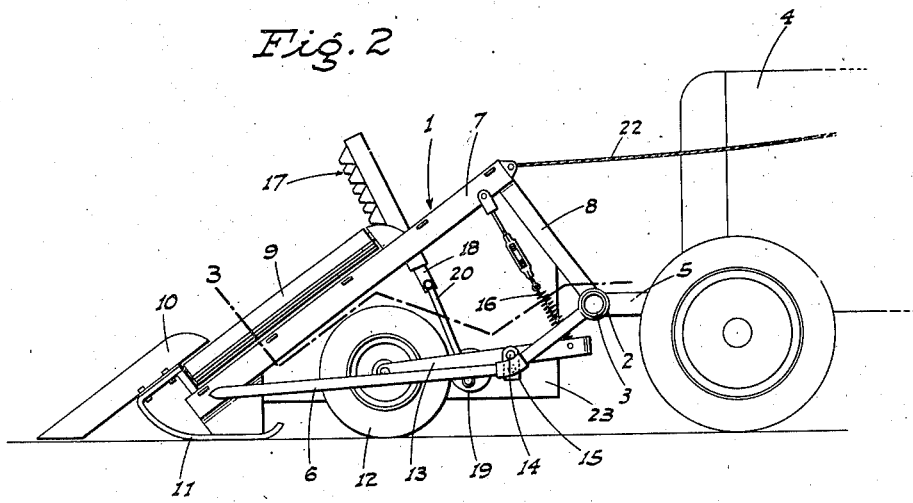
Figure 2 is a similar view but showing the splitting unit lowered to its operating position and with the protecting plate or skirt on the near side removed.
Figure 3:
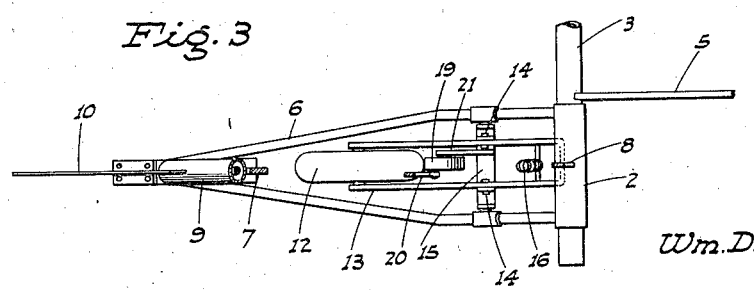
Figure 3 is a section plan of the unit taken on line 3—3 of Fig. 2.

Referring now more particularly to the characters of reference on the drawings, the splitter units, indicated generally at 1, and of which there are a pair disposed in laterally spaced relation, each includes a rear end transverse sleeve 2 turnable on a transverse shaft 3 which is common to both units and which is held rigid with and just in front of the tractor 4 by arms 5.

Side bars 6 rigid with the sleeve project downwardly and forwardly from the sleeve adjacent its ends in converging relation to their front end where they are rigidly connected to an upwardly and rearwardly sloping beam 7 which terminates at its rear end some distance above the sleeve and to which it is connected by a depending member 8.

A longitudinally extending vine splitting roller 9 is mounted on top of the beam and terminates short of the rear end of the same. An upwardly facing vine splitting knife 10 extends forwardly from the roller above the same and is mounted in connection with a ground engaging shoe 11 disposed rearwardly of the forward end of the knife and which shoe is rigidly supported from the beam 7.

Disposed between the side bars 6 rearwardly of the shoe is a ground engaging wheel 12. This wheel is mounted on a swing frame 13 disposed between the side bars 6 and pivoted as at 14 intermediate its ends on a cross member 15 supported by and extending between said bars 6 intermediate their ends. An adjustable tension spring unit 16 is connected between the beam 7 and the frame 13 rearwardly of the pivot 14 and acts to hold the wheel in yieldable engagement with the ground irrespective of any irreguuarities in the surface thereof as engaged by the shoe.

A vine cutting unit in the form of a short reciprocating mower 17 of conventional form is mounted in connection with and above the beam 7 just rearwardly of the roller 9.

The knife bar 18 of the unit projects through and below said beam and is reciprocated from a roller 19 by means of a pitman 20 connected to the bar 18 and the roller 19. Said roller frictionally engages the rear face of the wheel 12 and is supported from the cross member 15 by an arm 21.

The splitter unit is raised and lowered about the shaft 3 as an axis between inoperative and operative position, respectively, by a cable 22 or the like which extends rearwardly from the beam 7 along the tractor to a suitable operating mechanism thereon. When the unit is in its operative position it rests on the shoe 11 and wheel 12. Said wheel 12 and the cutter operating mechanism are enclosed and protected by side plates or skirts 23 which extend downwardly from the beam 7 over the side bars 6 and provide a smooth and relatively frictionless surface over which the vines are draped as the splitting unit moves ahead.

By reason of the above construction and arrangement of parts it will be seen that any vines which may not be cut through by the knife 10 or pulled apart as they are lifted by the forwardly moving and upwardly sloping roller 9, are positively cut through by the cutting unit 17 as the vines, if still not cut, reach the upper rear end of said roller 9. An efficient vine cutting and separating operation is thus assured under all conditions of operation and vine growth.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

In a device which includes a ground supported mobile main frame and a vine splitting and lifting means thereon, a vertically disposed sickle bar supported on the main frame to the rear of the splitting and lifting means, a roller journaled in the frame below the sickle bar, a pitman mounted on the end of the roller eccentrically of the longitudinal axis thereof and connected in operative arrangement with the sickle of the sickle bar, a swing frame pivoted to the main frame, a ground engaging wheel on one end of the swing frame, said wheel frictionally engaging said roller, and yieldable means connected between the other end of the swing frame and the main frame and effective to yieldably maintain the wheel in engagement with the ground and the roller.

WILLIAM D. HIRSCHKORN.

REFERENCES CITED

The following references are of record in the file of this patent:

UNITED STATES PATENTS

| Number | Name | Date |
|---|---|---|
| 122,630 | Messinger | Jan. 9, 1872 |
| 625,981 | Mussell | May 30, 1899 |
| 1,301,829 | Foutz | Apr. 29, 1919 |
| 2,305,254 | Hirschkorn | Dec. 15, 1942 |
| 2,340,919 | Allen | Feb. 8, 1944 |